(12) United States Patent
Danilak et al.

(10) Patent No.: US 9,575,844 B2
(45) Date of Patent: Feb. 21, 2017

(54) MASS STORAGE DEVICE AND METHOD OF OPERATING THE SAME TO BACK UP DATA STORED IN VOLATILE MEMORY

(71) Applicant: Skyera, LLC, San Jose, CA (US)

(72) Inventors: Radoslav Danilak, Cupertino, CA (US); Ladislav Steffko, San Ramon, CA (US); Guiqiang Dong, San Jose, CA (US); Qi Wu, San Jose, CA (US)

(73) Assignee: Skyera, LLC, San Jose, CA (US)

( * ) Notice: Subject to any disclaimer, the term of this patent is extended or adjusted under 35 U.S.C. 154(b) by 29 days.

(21) Appl. No.: 14/208,452

(22) Filed: Mar. 13, 2014

(65) Prior Publication Data

US 2014/0281315 A1  Sep. 18, 2014

Related U.S. Application Data

(60) Provisional application No. 61/793,141, filed on Mar. 15, 2013.

(51) Int. Cl.
*G06F 11/10* (2006.01)
*G06F 11/14* (2006.01)
*G06F 12/02* (2006.01)

(52) U.S. Cl.
CPC ......... *G06F 11/1456* (2013.01); *G06F 11/108* (2013.01); *G06F 11/1435* (2013.01); *G06F 11/1441* (2013.01); *G06F 12/0246* (2013.01); *G06F 2212/7201* (2013.01); *G06F 2212/7203* (2013.01)

(58) Field of Classification Search
CPC  G06F 11/1456; G06F 11/108; G06F 12/0246; G06F 11/1441; G06F 11/1435; G06F 2212/7201; G06F 2212/7203
See application file for complete search history.

(56) References Cited

U.S. PATENT DOCUMENTS

| | | | |
|---|---|---|---|
| 7,134,066 B2 | 11/2006 | Hassner et al. | |
| 7,565,488 B2 | 7/2009 | Fujie et al. | |
| 8,386,838 B1 | 2/2013 | Byan | |
| 8,516,172 B1 * | 8/2013 | Karamcheti et al. | 710/62 |
| 8,578,090 B1 | 11/2013 | Jernigan, IV | |
| 8,819,367 B1 * | 8/2014 | Fallone et al. | 711/162 |
| 9,043,545 B2 | 5/2015 | Kimmel et al. | |
| 9,075,710 B2 | 7/2015 | Talagala et al. | |
| 2005/0086575 A1 | 4/2005 | Hassner et al. | |
| 2005/0102557 A1 | 5/2005 | Davies et al. | |
| 2006/0184731 A1 | 8/2006 | Corbett et al. | |
| 2006/0248378 A1 | 11/2006 | Grcanac et al. | |
| 2007/0094531 A1 | 4/2007 | Ni et al. | |
| 2008/0126715 A1 | 5/2008 | Fujie et al. | |

(Continued)

*Primary Examiner* — Idriss N Alrobaye
*Assistant Examiner* — Ronald Modo
(74) *Attorney, Agent, or Firm* — Wilmer Cutler Pickering Hale and Dorr LLP

(57) ABSTRACT

A mass storage memory device is disclosed. The device includes a nonvolatile memory, a volatile memory configured to store logical to physical (L2P) data associating logical addresses of data stored in the nonvolatile memory with physical locations of the nonvolatile memory at which the data is stored, and a controller. The controller writes L2P data in the nonvolatile memory so the L2P data can be preserved through a power failure. The controller also writes L2P data stored in the nonvolatile memory to the volatile memory to rebuild the L2P table.

15 Claims, 7 Drawing Sheets

(56) References Cited

U.S. PATENT DOCUMENTS

| | | | |
|---|---|---|---|
| 2009/0089485 A1* | 4/2009 | Yeh | G06F 12/0246 711/103 |
| 2009/0157950 A1* | 6/2009 | Selinger | 711/103 |
| 2012/0173932 A1 | 7/2012 | Li et al. | |
| 2012/0221891 A1* | 8/2012 | Shimizu | G06F 11/1441 714/15 |
| 2014/0281315 A1 | 9/2014 | Danilak et al. | |
| 2014/0281691 A1 | 9/2014 | Danilak et al. | |
| 2015/0212911 A1 | 7/2015 | Nolterieke et al. | |

\* cited by examiner

MASS STORAGE DEVICE AND METHOD OF OPERATING THE SAME TO BACK UP DATA STORED IN VOLATILE MEMORY

REFERENCES TO RELATED APPLICATIONS

This application claims the benefit of U.S. Provisional Application No. 61/793,141 filed Mar. 15, 2013, which is hereby incorporated in its entirety and for all purposes.

FIELD OF THE INVENTION

The present invention relates, generally, to mass storage devices and, more particularly, to methods of storing and recovering redundant data, and systems implementing the methods.

BACKGROUND OF THE INVENTION

Mass storage systems are used to store large amounts of data. Important parameters of such devices include speed and reliability. The systems preferably operate without error for long uninterrupted periods of time. To accomplish this, the systems store system data in addition to user data. The system data may be used to recover user data which is lost because of, for example, a power failure or a hardware failure.

Some systems use RAID (redundant array of independent disks) technology. RAID technology uses multiple memory components to form a single logical memory storage unit. The stored data is distributed among the memory components, and includes the system data for data recovery. Depending upon what level of RAID technology is used, the system may be able to recover from multiple errors. For example, RAID technology may allow for recovery from multiple errors. For example, RAID6 technology allows for recovery from two errors.

SUMMARY OF THE INVENTION

One implementation is a mass storage device, including a nonvolatile memory having physical data storage locations, a volatile memory configured to store logical to physical (L2P) data associating logical addresses of data stored in the nonvolatile memory with the physical locations of the nonvolatile memory at which the data is stored, and a controller. The controller is configured to receive data associated with logical addresses, to write data corresponding to the received data to physical locations in the nonvolatile memory, and to write L2P data in the volatile memory, where the written L2P data associates the logical addresses of the received data to the physical locations of the data written to the nonvolatile memory. The controller is also configured to write L2P change data to the nonvolatile memory representing a change in the L2P data of the volatile memory.

Another inventive aspect is a mass storage device. The device includes a first nonvolatile memory having physical data storage locations, a volatile memory configured to store logical to physical (L2P) data associating logical addresses of data stored in the first nonvolatile memory with the physical locations of the first nonvolatile memory at which the stored data is stored, and a controller. The controller is configured to accesses table data representing L2P table data stored in the first nonvolatile memory, accesses change data representing a change to the table data, regenerate L2P table data based on the table data and the change data, and write the regenerated L2P table data to the volatile memory.

Another inventive aspect is a mass storage device. The device includes a nonvolatile memory having physical data storage locations, a volatile memory configured to store system management data to be backed up in the nonvolatile memory, and a controller. The controller is configured to write the system management data to the volatile memory, operate the nonvolatile memory according to the stored system management data, and write a portion of the system management data to the nonvolatile memory. The controller is also configured to maintain an unwritten portion of the system management data, where the unwritten portion is not backed up to nonvolatile memory, and where the unwritten portion is maintained to be less than an amount of data which can be written to the nonvolatile memory in two write cycles.

Another inventive aspect is a mass storage device. The device includes a nonvolatile memory, a volatile memory configured to store data to be backed up in the nonvolatile memory, and a controller. The controller is configured to write the data to the volatile memory, write a portion of the data to the nonvolatile memory, and maintain an unwritten portion of the data, where the unwritten portion is not backed up to nonvolatile memory, and where the unwritten portion is maintained to be less than an amount of data which can be written to the nonvolatile memory in two write cycles.

BRIEF DESCRIPTION OF THE DRAWINGS

The accompanying drawings, which are incorporated in and constitute a part of this specification, illustrate implementations of inventive concepts and, together with the description, serve to explain various advantages and principles of the invention.

DETAILED DESCRIPTION OF THE INVENTION

Reference is made to implementations illustrated in the accompanying drawings. The same reference numbers are generally used throughout the drawings and the following description to refer to the same or like parts.

Figure 1:
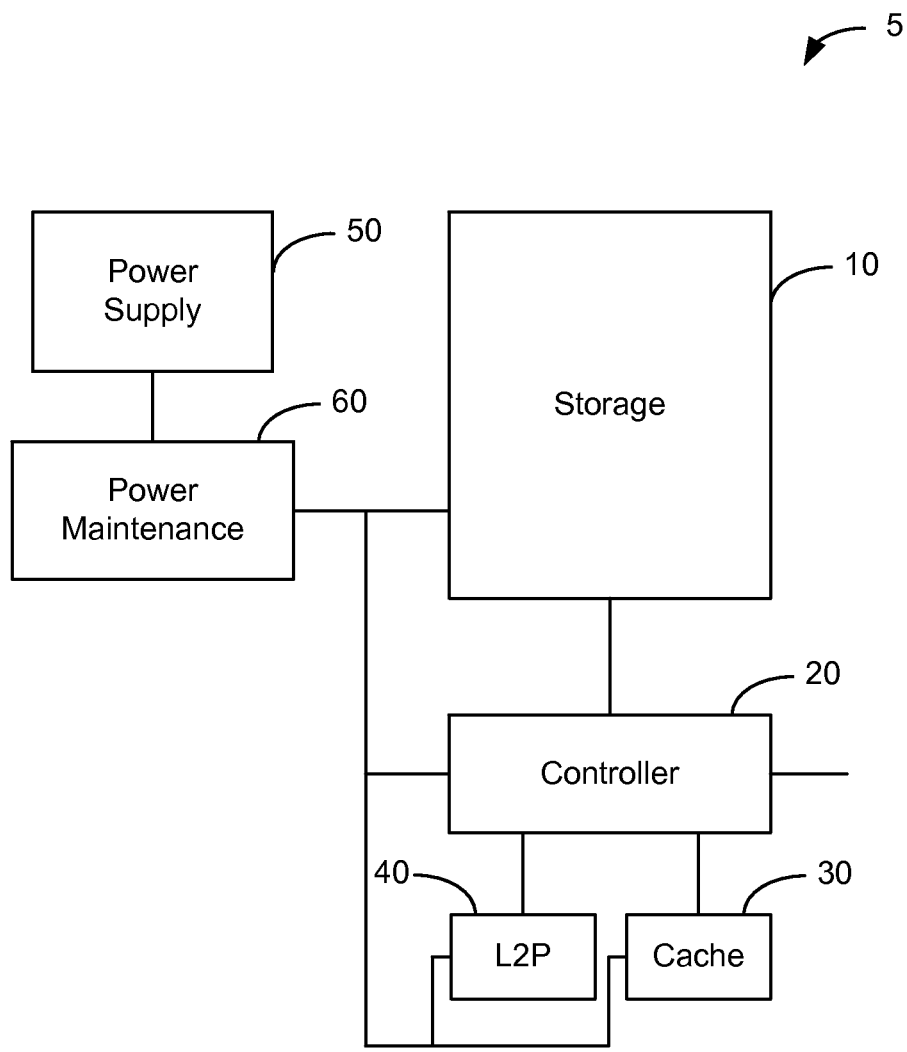
FIG. 1 is a block diagram illustrating an implementation of a mass storage system.

FIG. 1 is a block diagram illustrating a mass storage system 5. As shown, mass storage system 5 includes storage 10, a system controller 20, a cache 30, a logical to physical lookup table (L2P) 40, a power supply 50, and a power maintenance circuit 60. The mass storage system 5 implements RAID technology to recover from errors. The mass storage system 5 may be, for example, used by multiple applications simultaneously for storing and retrieving data related to the operation of the applications.

Storage 10 is configured to store electronic data, for example, in a nonvolatile memory. In some implementations, the storage 10 includes SLC (single level cell) NAND flash memory technology. The storage 10 may additionally or alternatively include one or more of MLC (multilevel cell), NOR, PCM, Spin-Torque, MRAM, Memsistors, or other technologies.

System controller 20 is configured to operate the system 5 at least by performing read, write, and erase operations, as well as these and operations to implement RAID functionality. The system controller 20 is configured to receive read and write instructions, and data to be written from an external source (not shown). The system controller 20 is also configured to receive read data from the storage 10, and to provide the read data to the external source.

Cache 30 includes a fast nonvolatile memory storage, such as MRAM. System controller 20 is configured to store certain data in the cache 30, for example, in response to an imminent power loss.

L2P table 40 includes a fast volatile memory storage, such as DRAM. The data stored in L2P table 40 includes data which maps logical memory addresses as used by the external source to physical memory addresses of the storage 10.

Each of the storage 10, the system controller 20, the cache 30, and the L2P table 40 receive power from power supply 50 and power maintenance circuitry 60. Power maintenance circuitry 60 is configured to maintain power to the other components for a minimum duration after a loss of power from the power supply 50. In some implementations, power maintenance circuitry 60 is a plurality of capacitors and super capacitors.

Figure 2:
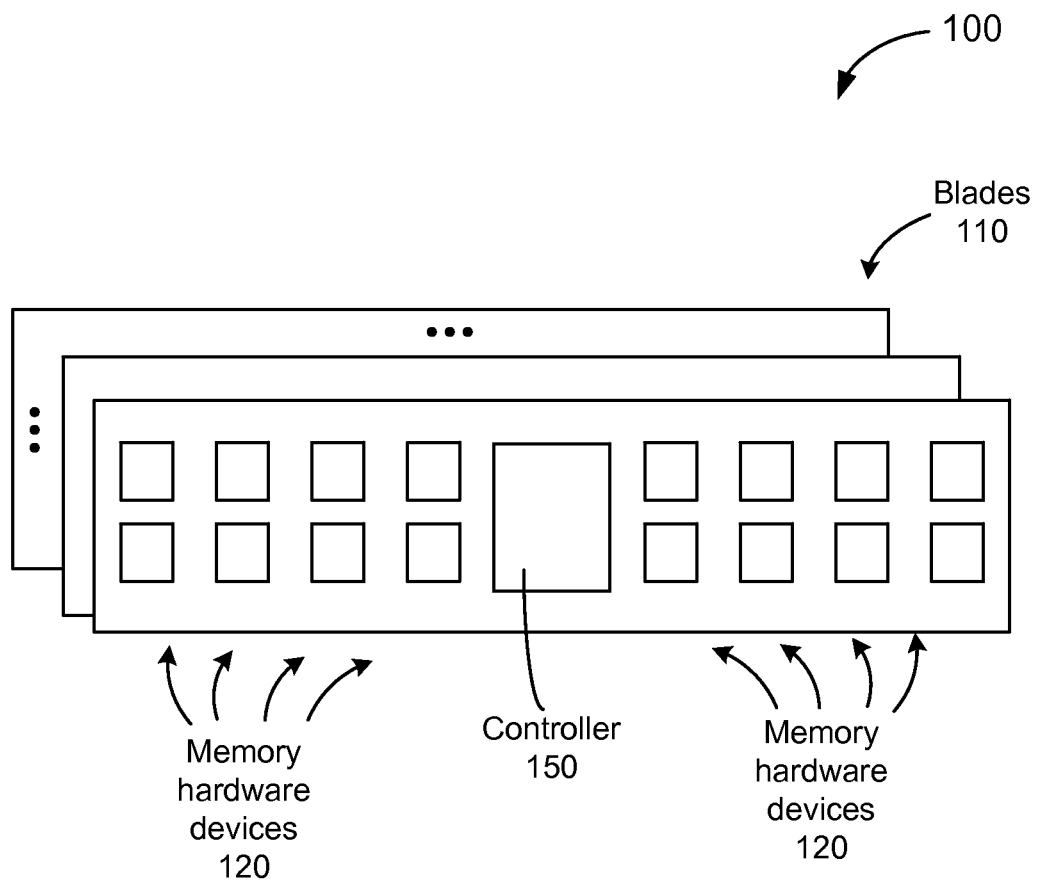
FIG. 2 is a block diagram illustrating an implementation of a mass storage device, which can be used in the system of FIG. 1.

FIG. 2 is a block diagram illustrating an implementation of a mass storage device 100, which may be used in the mass storage system 5 of FIG. 1. As shown, the mass storage device 100 includes multiple blades 110, where each of the blades 110 includes a controller 150 and multiple memory hardware devices 120. In some implementations, memory hardware devices 120 are located on both front and back surfaces of each of the blades 110. The mass storage device 100 may also include a system controller (not shown) configured to cause the mass storage device 100 to perform the operations and actions described herein.

As an example, the mass storage device 100 may include 24 blades 110, and each of the blades 110 may include 32 memory hardware devices 120. Each of the memory hardware devices 120 may include 64 GB of storage capacity. In such an implementation, each of the blades 110 has 2 TB of memory storage capacity, and the mass storage device 100 has 48 TB of memory storage capacity. The mass storage device 100 also includes a controller 150, which is configured to control the read, write, and erase operations of the mass storage device 100. In some implementations, the number of blades 110, the number of memory hardware devices 120 on each blade 110, and/or the amount of storage capacity included in each of the memory hardware devices 120 may be different.

Figure 3:
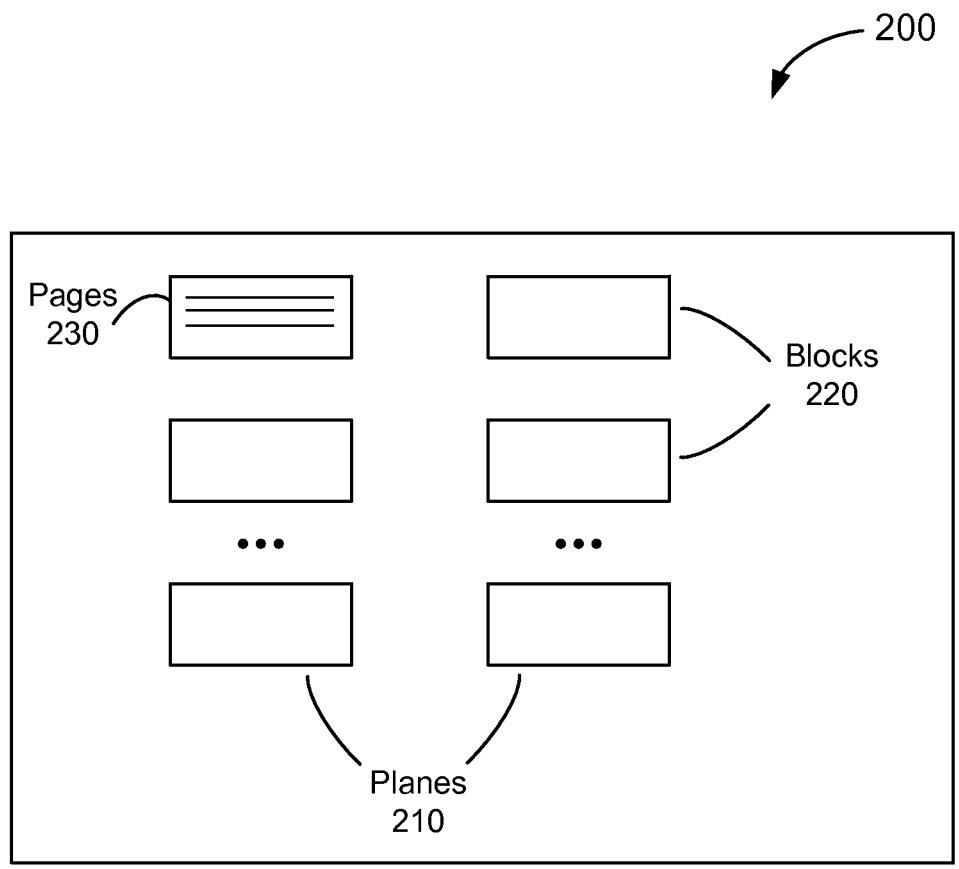
FIG. 3 is a schematic diagram illustrating a single die.

In some implementations, each of the memory hardware devices 120 includes multiple die. For example, each of the memory hardware devices 120 may include four die. FIG. 3 is a schematic diagram illustrating a single die 200. As shown, the die 200 includes two planes 210, where each of the planes includes multiple blocks 220, and each of the blocks 220 includes multiple pages 230. In addition, each of the pages 230 includes multiple memory cell locations.

As an example, each of the pages 230 may include 128K bits (or memory cell locations). Furthermore, each of the blocks may include 256 pages 230, and each of the planes 210 may include $2^{11}$ blocks 220. Such a die has a storage capacity of 16 GB. In some implementations, the number of planes 210, the number of blocks 220 in each plane 210, and/or the number of pages 230 in each block 220 may be different.

In some implementations, the planes 210 can be separately and simultaneously written, read, and erased. For some memory technologies, each time data is written to or read from the die, an entire page is written or read. For some memory technologies, each time data is erased an entire block of data is erased.

In some implementations, data written to the mass storage device 100 is written in stripes. A stripe includes one or more pages 230 from each of multiple blades 110. In some implementations, each stripe includes one or more pages 230 from all of the blades 110. For example, a stripe may include one page 230 from each plane 210 of one or more die 200 of each memory hardware device 120 on each of the blades 110.

In order to implement RAID technology in an n blade mass storage device where stripes extend across all of the blades, data may be written to n-2 of the blades along one of the stripes, and parity data based on the data written to the n-2 blades may be written along the stripe in the last 2 blades. The parity data is written to the last 2 blades such that each bit of each page of the last 2 blades corresponds with the parity data of a set of corresponding bits of corresponding pages of the data written to the n-2 blades, where each set of corresponding bits includes one bit per blade.

In some implementations, one of the last 2 blades receives parity data of a first type and the other of the last 2 blades receives parity data of a second type. Various types of parity data may be used. For example, xor of the data written to the n-2 blades, and Reed Solomon parity data or square of xor parity data may be used.

In some implementations, the parity data for a stripe is calculated as each page or other portion of the stripe is written. Alternatively, the parity data for the data of the stripe in the n-2 blades may be calculated after the data is written to the n-2 blades.

In some implementations, the last 2 blades are not always the same 2 blades. Instead, which two blades are used for parity information changes. For example, a first two blades may be assigned for use as parity data storage for a first stripe, and a second two blades may be assigned for use as a data storage for a second stripe. This may be advantageous at least because the parity information is not read during normal operation, and distributing the parity data among all of the blades balances the read load across the blades.

In some implementations, the controller 150 on each of the blades 110 is configured to perform an error correction function. Each controller 150 is configured to detect, and attempt to correct data errors which have occurred on the blade 110 associated therewith. If an error has occurred which cannot be corrected by a controller 150, the mass storage device 100 may correct the error using the parity data stored in the last 2 blades 110 of the device 100. If a single error has occurred, the parity data of one of the 2 types of parity data, for example, the xor parity data, may be used to correct the error. If two errors have occurred, the parity data of both of the 2types of parity data may be used to correct the errors.

In some systems, in order to implement RAID technology in an n blade mass storage device where stripes extend across all of the blades, data may be written to n-m of the blades along one of the stripes, and parity data based on the data written to the n-m blades may be written along the stripe in the last m blades, where m is three or more, such as in RAID7 or RAID8 technology. The parity data is written to the last m blades such that each bit of each page of the last m blades corresponds with the parity data of a set of corresponding bits of corresponding pages of the data written to the n-m blades, where each set of corresponding bits includes one bit per blade.

In some implementations, each of the last m blades receives parity data of a different type. In some implementations, one or more of the last m blades receives parity data which is the same type as the parity data received by one or more others of the last m blades. Various types of parity data may be used. For example, xor of the data written to the n-m blades, and Reed Solomon parity data or square of xor parity data may be used.

In some implementations, the parity data for a stripe is calculated as each page or other portion of the stripe is written. Alternatively, the parity data for the data of the stripe in the n-m blades may be calculated after the data is written to the n-m blades.

In some implementations, the last m blades are not always the same m blades. Instead, which blades are used for parity information changes. For example, a first m blades may be assigned for use as parity data storage for a first stripe, and a second m blades may be assigned for use as a data storage for a second stripe. This may be advantageous at least because the parity information is not read during normal operation, and distributing the parity data among all of the blades balances the read load across the blades.

In some implementations, if an error has occurred which cannot be corrected by a controller 150, the mass storage device 100 may correct the error using the parity data stored in the last m blades 110 of the device 100. If a single error has occurred, the parity data of one of the m types of parity data, for example, the xor parity data, may be used to correct the error. Likewise, if two or more errors have occurred, the parity data of two or more types of parity data may be used to correct the errors.

In some circumstances, errors can be caused by the failure of a blade, causing the data stored on the blade to be lost. The blade failure may include a failure of the entire blade, or a failure of one or more portions of the blade. For example, a blade failure may include a failure of any of a plane, a block, a page, a die, a memory hardware device, a controller, and any other portion of a blade which renders the blade partially or wholly inoperative. The blade failure may additionally or alternatively include a circumstance in which any of a blade, a plane, a block, a page, a die, a memory hardware device, a controller, and any other portion of a blade which renders the blade partially or wholly unavailable. For example, when the system performs an operation, such as a reset, an erase, or programming operation, the blade or a portion of the blade may be occupied by the operation and therefore unavailable or inaccessible for, for example, a data read operation. In such circumstances, the effect of, for example, "replacing" the blade is achieved by the blade becoming available after the occupying operation has completed.

Conventionally, mass storage systems experiencing the failure of a blade must use data throughout the entire memory system to recover the lost data. Accordingly, to recover the lost data, all of the data stored in the memory is rebuilt. Such recovery is extremely time-consuming, and must be performed prior to the conventional mass storage system being operational following the failure.

In the mass storage device 100, because the parity information stored in the last 2 blades and is stored by stripe, data lost because of the failure of a blade can be recovered stripe by stripe. For example, using known techniques, which vary according to the type of parity used, data unavailable because of the failure of a blade may recovered by regenerating or calculating the unavailable data based on the parity bits and the data stored in the other blades of each stripe. For example, for each stripe, there may be 2 parity bits. To regenerate the data in a particular stripe of an unavailable blade, the unavailable data is calculated based on the data in the particular stripe of the remaining available blades and the 2 parity bits for the particular stripe.

Because the process of recovering the data of each stripe is sufficiently fast, the data lost because of the blade failure can be recovered as needed. For example, if a read operation is to be performed, and the location of the data to be read includes a page which has not been recovered, the system may then, in response to the read operation, recover the data of the lost page. In some instances, some pages may be erased before the data stored therein is needed. For such pages, the data is not needed and may not be recovered.

Further reducing the impact of a blade failure, in some implementations, the allocation of memory capacity to applications being served may be thinly provisioned. Thin provisioning allows for memory capacity which has been allocated, but not used, to be shared by multiple applications. For example, each of the applications using mass storage device 100 may be allocated an amount of storage capacity corresponding to need and type of application, where the total amount of capacity allocated to the applications is greater than the actual physical capacity of the mass storage device 100. For example, mass storage device 100 may have a total physical capacity of 44 TB, but the total of capacity allocated to the applications may be 100 TB.

In such thinly provisioned systems, the memory storage capacity for each application is virtually allocated thereto. Accordingly, physical sections of the mass storage device are not assigned to specific applications a priori, but instead, are assigned as they are used. With this allocation scheme, the data within the mass storage device for each application tends to become segmented and unorganized. To minimize this effect, part of the normal operation of a thinly provisioned device may be to move data from location to location in order to have the data stored in a more optimized configuration.

Because the normal operation of a thinly provisioned device includes rearranging and reorganizing data, the impact of a blade failure may be minimal. If such a blade failure occurs, the system may note that the failed blade is unavailable for writing and erasing, and may continue to operate normally. In some embodiments, if data is to be read from the failed blade, the lost data from the failed blade is regenerated using the parity bits as discussed above, and is rewritten elsewhere in the memory to a blade which is operational.

Likewise, once the failed blade is replaced with an operational blade, the system may note that the new blade is available for reading, writing, and erasing. Because the mass storage device 100 is configured to continue to operate despite having a failed blade and to continue to operate despite having a newly replaced blade, utilization time of the mass storage device 100 is maximized and performance is optimized.

Figure 4:
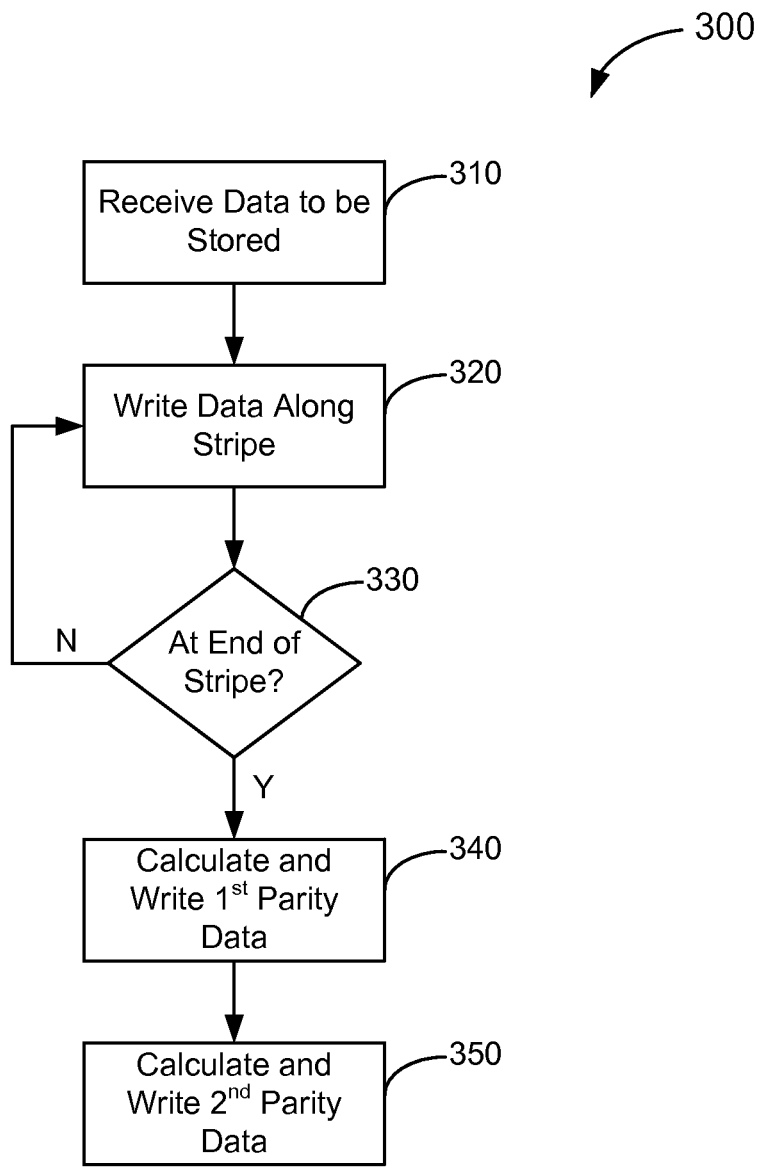
FIG. 4 is a flowchart diagram illustrating an implementation of a method of writing data to a mass storage device.

FIG. 4 is a flowchart diagram illustrating an implementation of a method of writing data to a mass storage device, such as the mass storage device 100. The mass storage device implements RAID technology for recovery of multiple errors. The mass storage device may be, for example, used by multiple applications simultaneously for storing and retrieving data related to the operation of the applications.

In step 310, data is received which is to be written to storage device 100. The data may be received from one of the applications in communication with the mass storage device 100. The data may be modified in preparation for storage. For example, the data may be rearranged or segmented so as to be written along a stripe of the mass storage device 100. In some embodiments, preparation for storage includes compressing the data.

In step 320, the data is written along a stripe extending across multiple blades configured for storage of application data. As the data is written, at step 330, a determination is made as to whether the previously written data was written to the last page of the last blade configured for storage of application data. If the previously written data was not written to the last page of the last blade configured for storage of application data, additional data is written in step 320. If the previously written data was written to the last blade configured for storage of application data, parity data is calculated and written in steps 340 and 350.

In step 340, parity data of a first type is calculated, for example, as discussed above. The parity data of the first type is stored along the same stripe as the data written in step 330 in one of two blades configured for storage of parity data. The first type of parity data may, for example, be xor data based on the data written in step 330.

In step 350, parity data of a second type is calculated, for example, as discussed above.

The parity data of the second type is stored along the same stripe as the data written in step 330 in the other of the two blades configured for storage of parity data. The second type of parity data may, for example, be squared xor or Reed Solomon data based on the data written in step 330.

In systems which use additional parity bits, additional parity bits of the same or additional parity types are calculated and stored along the same stripe as the data written in step 330 to additional blades configured for storage of the additional parity bits.

As discussed above, the L2P table 40 is used to store correspondence data associating logical addresses with physical addresses. Each time data is written to the storage 10, the system controller 20 receives a logical address from the external source as well as the data to be written. The system controller 20 determines a physical address to store the received data or data corresponding to the received data. To ensure that the data can be read in response to a read instruction from the external source including the logical address, the physical address to which the data was written is stored in the L2P table 40 such that correspondence between the physical address and the logical address is available when needed.

As discussed above, in response to certain conditions, the system controller 20 is configured to change the physical location of previously written data. As part of this operation, the system controller may be configured to update the L2P table 40 such that correspondence between the physical address and the logical address is preserved.

In some implementations, the system controller 20 is configured to detect that a power failure is imminent. For example, the system controller 20 may detect that the power supply 50 is no longer operational. Because the power maintenance circuitry 60 is configured to maintain power supply to the other components for a time, the system controller 20 may be configured to use that time to prepare for the imminent power failure. The preparation may include storing data to ensure that the integrity of the data stored in the system 5 is maintained until the power is once again restored.

Because storage 10 includes nonvolatile memory, the data stored therein may be preserved throughout the duration of the power loss. The L2P table 40, however, is stored in volatile memory. Accordingly, the data in the L2P table 40 is lost upon power loss. In order to preserve the correspondence information between the physical addresses and the logical addresses of the data stored in storage 10 during the power loss, the data in the L2P table 40 can be written to nonvolatile storage 10.

The time for which the power maintenance circuitry 60 maintains power, however, may be insufficient to write the entire contents of the L2P table 40 to the nonvolatile storage 10 after detection of imminent power failure. In some embodiments, the system controller 20 is configured to maintain the information of the L2P table 40 in the nonvolatile storage 10 during normal operation of the system 5. To maintain the information the L2P table 40 in the nonvolatile storage 10, the system controller 20 may be configured to write the entire contents of the L2P table 40 to the nonvolatile memory storage 10. Because it may be impractical to write the entire contents of the L2P table 40 upon each change of the data in the L2P table 40, once the entire contents is written to the nonvolatile storage 10, subsequent writing of the L2P table 40 data may include updates or data representing changes in the L2P table 40.

For example, the system controller 20 may determine that the entire contents of the L2P table 40 should be written to the nonvolatile storage 10. Once the entire contents are written, the system controller 20 may write updates or data encoding subsequent changes in the data in the L2P table 40 to the nonvolatile storage 10. In some embodiments, the system controller 20 is configured to write the entire contents of the L2P table 40 following a predetermined number of updates subsequent to the entire contents having been written.

Because it may even be impractical to write change data to the nonvolatile storage 10 after each update of the data in the L2P table 40, the system controller 20 may maintain a list of changes to the L2P table 40 data and write batches of multiple changes to the nonvolatile memory based on the list. The system controller 20 may, for example, be configured to write the changes in the list to the nonvolatile storage 10 once the list includes a minimum number of changes.

Figure 5:
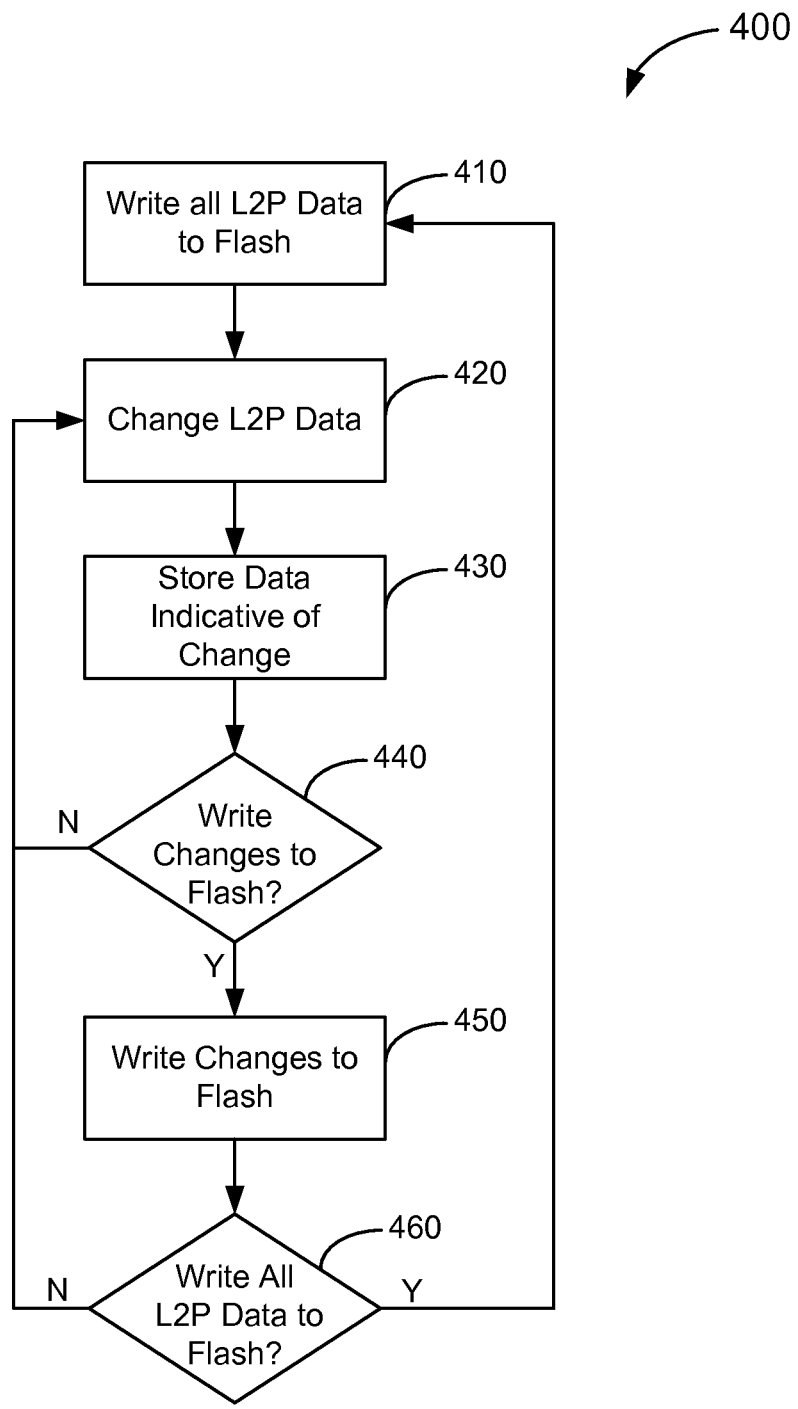
FIG. 5 is a flowchart diagram illustrating an implementation of a method of storing logical to physical table data for a mass storage device.

FIG. 5 is a flowchart diagram illustrating an implementation of a method of storing logical to physical table data for a mass storage device during normal operation. As discussed above, maintaining L2P information in nonvolatile memory allows for more convenient recovery from power loss.

In step 410, the entire contents of the L2P table is written to nonvolatile memory. In some embodiments, the entire contents of the L2P table data are not to be written to nonvolatile memory. Instead, only the locations which are not already currently in the nonvolatile memory are written thereto.

In step 420, data in the L2P table is changed. For example, as part of normal operation of the system, when data is written to the nonvolatile memory, the system determines a physical memory location for the data to be written to, and records the physical location in the L2P data table such that the physical location is associated with the logical address corresponding with the written data. Other activities which caused changes to the L2P table include user level actions, such as and erase operation, internal system activity, such as garbage collection, and administrative activities, such as repartitioning, cloning, and backups.

In step 430, change data indicative of the L2P data change of step 420 is stored, for example, in volatile memory. In some implementations, the change data includes the physical memory location and the logical address. In some implementations, the change data includes a reference or address in the L2P data table associated with the changed data.

In step 440, the system determines whether to write previously stored L2P table change data to the nonvolatile memory. The determination may be made, for example, based on the number of changes previously stored. For example, the nonvolatile memory may be configured to be written in pages, and the determination may be made as to whether the number of changes previously stored requires at least one page of nonvolatile memory capacity. In some implementations, the determination may be made based on whether the previously stored changes require a minimum number of pages of nonvolatile memory capacity. In some implementations, the amount of data to be written to the nonvolatile memory representing the stored changes is kept below a maximum amount of data which the system is capable of writing to the nonvolatile memory after detection of an imminent power failure. If the system determines the data changes are not to be written to the nonvolatile memory, the method returns to step 420.

If the system determines that the changes are to be written to the nonvolatile memory, the method proceeds to step 450, where data corresponding to the changes are written to the nonvolatile memory using, for example, one or more aspects of the methods of writing data described above.

In step 460, the system determines whether to write the entire contents of the L2P data table to the nonvolatile memory. In some implementations, the entire contents are written to the nonvolatile memory periodically. In some implementations, the entire contents are written to the nonvolatile memory in response to the number of changes to the L2P data table reaching a threshold. Additionally or alternatively, the entire contents may be written to the nonvolatile memory in response to the nonvolatile memory capacity used by changes to the L2P data table reaching a threshold.

If the system determines to write the entire contents of the L2P data table, the method proceeds to step 410. The system determines to not write the entire contents of the L2P data table, the method proceeds to step 420.

In some implementations, steps 430 and 440 are omitted. In such implementations, each time data is changed in the L2P table, data corresponding to the change is written to the nonvolatile memory.

Figure 6:
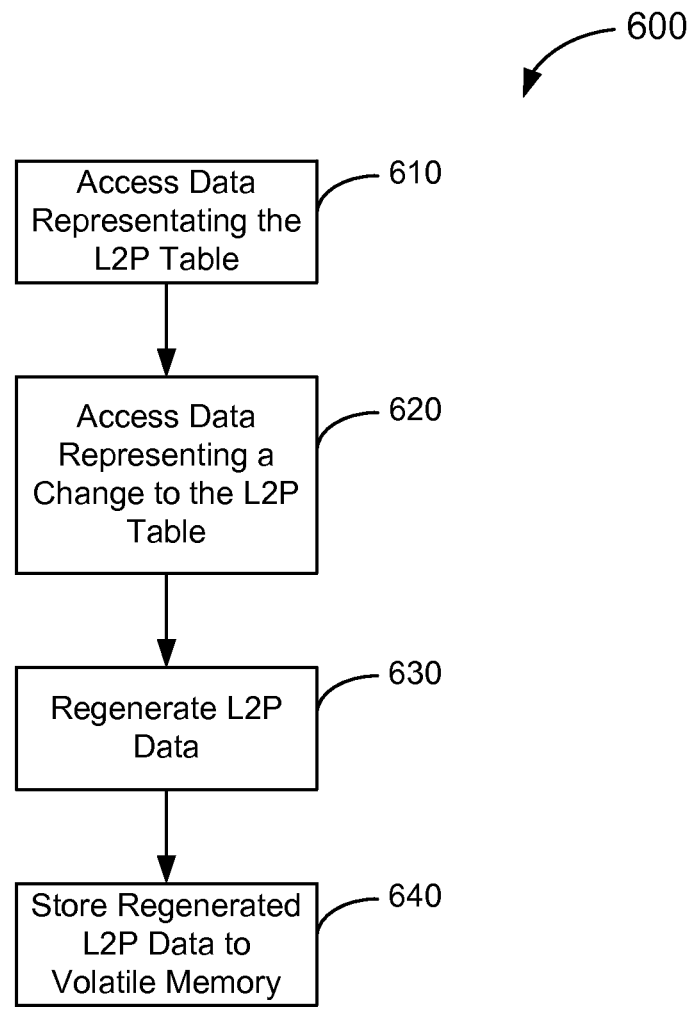
FIG. 6 is a flowchart diagram illustrating an implementation of a method of rebuilding a logical to physical table data for a mass storage device.

FIG. 6 is a flowchart diagram illustrating an implementation of a method 600 of rebuilding L2P table data. Method 600 may be used, for example, after power has been restored to a mass storage device in which L2P data has been saved, for example, using the method of FIG. 5.

In step 610, a controller accesses data representing L2P table data stored in a nonvolatile memory. In some implementations, the data representing the L2P table data represents all of the data in the L2P table when written to the nonvolatile memory. In some implementations, the data representing the L2P table data represents a portion of all of the data in the L2P table when written to the nonvolatile memory.

In step 620, the controller accesses data from the nonvolatile memory representing a change to the data accessed in step 610. For example, the data accessed in step 610 may associate a first physical location with a first logical address, and the data accessed in step 620 may associate the first physical location with a second logical address.

In step 630, the controller uses the data accessed in steps 610 at 620 to regenerate the L2P table data. For example, the controller may determine a logical address for each of the physical locations of the data accessed in step 610. In some implementations, the logical address for each physical location is the logical address associated therewith in the data accessed in step 610, unless the data accessed in step 620 associates a different logical address therewith, in which case the logical address is the logical address associated therewith in the data accessed in step 620.

In step 640, the controller writes the regenerated data of step 630 to a volatile memory, such as look up table 40 of FIG. 1.

Figure 7:
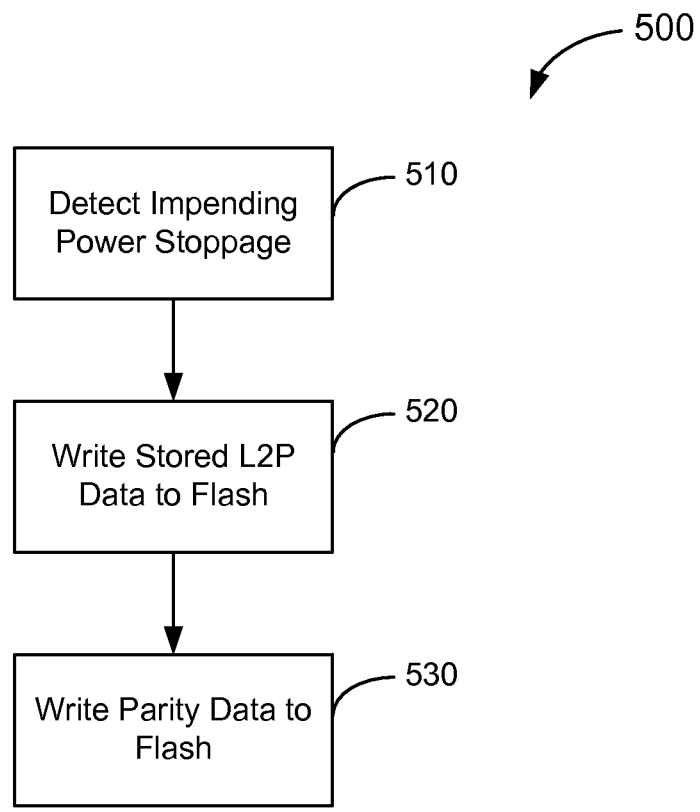
FIG. 7 is a flowchart diagram illustrating an implementation of a method of responding to an imminent loss of power.

FIG. 7 is a flowchart diagram illustrating an implementation of a method 500 of responding to an imminent loss of power. As discussed above, the power maintenance circuitry maintains power to the system for a time. This allows the system to write stored L2P data table changes to the nonvolatile memory.

In step 510, an imminent power failure is detected. In response to the imminent power failure, in step 520, stored L2P data changes which have not been written to the nonvolatile memory are stored in the nonvolatile memory. In some implementations of the method of FIG. 7, for example, if the nonvolatile memory uses SLC technology, data writes to the nonvolatile memory which are currently active at the time the imminent power failure is detected are allowed to finish before step 520 in a step not shown in FIG. 7. The L2P data changes written to the nonvolatile memory in step 520 may be written according to aspects of step 450 discussed above with reference to FIG. 5. In step 530, parity data is written to the nonvolatile memory. The parity data may be written, for example, according to aspects of steps 340 and 350 discussed above with reference to FIG. 4.

In some implementations, the method of FIG. 7 can be completed with two write cycles after detection of an imminent loss of power. This may be accomplished, for example, by allowing the outstanding write operations to finish and writing L2P table data during a first write cycle, and writing parity data during of the first cycle writes during a second write cycle. In some implementations, the write operations may be performed with different timing assignments.

In some implementations, other data is additionally written to nonvolatile memory. For example, system management data, logical unit numbers (LUNs), snapshots and clones, partitions, erase counts, read counts, and lists of currently active blocks may be written to nonvolatile memory after detection of an imminent power loss.

For example, in some embodiments a system including volatile and nonvolatile memory, the system may be operated according to system management data, which has been written to the volatile memory. For backup or other purposes, at least a portion of the system management data may be written to the nonvolatile memory. As a result, the system management data is preserved in the event of, for example, a power failure.

In some embodiments, the system management data is written to the nonvolatile memory as it is changed such that all system management data is stored in the nonvolatile memory. In some embodiments, changes to the system management data are written to the nonvolatile memory. In some embodiments, portions of the system management data in the volatile memory, which are not represented in the nonvolatile memory are limited such that in two write cycles, the nonvolatile memory may be written such that all system management data in the volatile memory is represented in the nonvolatile memory.

In some embodiments, other data may have been written to the volatile memory. For backup or other purposes, at least a portion of the other data may be written to the nonvolatile memory. As a result, the other data is preserved in the event of, for example, a power failure.

In some embodiments, the other data is written to the nonvolatile memory as it is changed such that all other data is stored in the nonvolatile memory. In some embodiments, changes to the other data are written to the nonvolatile memory. In some embodiments, portions of the other data in the volatile memory, which are not represented in the nonvolatile memory are limited such that in two write cycles, the nonvolatile memory may be written such that all other data in the volatile memory is represented in the nonvolatile memory.

The power maintenance circuitry may be sized and configured so that the time for preparing for the power failure is about or at least two write cycles of the nonvolatile memory. Because the time for preparing for the power failure is so short, the design, component, and space costs associated with the power maintenance circuitry is minimized.

In some implementations of the method of FIG. 7, one or more of the steps may fail. In response to detecting such a failure, the system may be configured to complete the failed steps by writing the data of the failed steps to a fast nonvolatile memory such as cache 30 of FIG. 1.

While various embodiments of present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A mass storage device, comprising:
 a first nonvolatile memory comprising:
  a plurality of blades having a plurality of physical data storage locations;
  at least two of the plurality of blades configured to store parity data; and
  the remaining blades configured to store data including logical to physical (L2P) data written to the device, wherein the data is stored along stripes of the remaining blades, and wherein the stripes extend along at least some of the remaining blades;
 a volatile memory configured to store L2P data, wherein the L2P data associates logical addresses of data stored in the first nonvolatile memory with the physical locations of the data stored in the first nonvolatile memory; and
 a controller configured to:
  receive data;
  receive logical addresses associated with the data;
  write the data to physical locations along the stripes of the remaining blades within the first nonvolatile memory;
  write L2P data to an L2P data table in the volatile memory, wherein the written L2P data associates the logical addresses of the data with the physical locations of the data written to the first nonvolatile memory;
  write the entire L2P data table from the volatile memory to the stripes of the remaining blades within the first nonvolatile memory;
  write L2P change data to the L2P data table in the volatile memory, reflecting an update or change to data in the L2P data table;
  subsequent to the entire L2P data table having been written to the stripes of the remaining blades within the first nonvolatile memory and following a predetermined number of updates to the L2P data table in the volatile memory, write the entire contents of the L2P data table from the volatile memory to the stripes of the remaining blades within the first non volatile memory; and
  write parity data along stripes of at least the two of the plurality of blades within the first nonvolatile memory, wherein the parity data within the stripes is based on data including the L2P data written to the stripes of the remaining blades, and wherein the parity data includes at least two types of parity data.

2. The mass storage device of claim 1, wherein the controller is further configured to write the L2P change data to the first nonvolatile memory in response to receiving an indication of an imminent power loss.

3. The mass storage device of claim 2, further comprising:
 a second nonvolatile memory, wherein the controller is further configured to determine that a portion of the L2P change data was not successfully written to the first nonvolatile memory, and to write the portion to the second nonvolatile memory.

4. The mass storage device of claim 1, wherein the controller is further configured to:
 determine a quantity of changes to the L2P data table since a most recent write of the L2P change data from the volatile memory to the first nonvolatile memory; and
 write the changes to the L2P data table from the volatile memory to the first nonvolatile memory in response to the quantity being greater than a predetermined non-zero threshold.

5. The mass storage device of claim 1, wherein the controller is further configured to maintain a portion of L2P change data unwritten to the first nonvolatile memory, and wherein the unwritten portion is maintained to be less than an amount of data which can be written to the first nonvolatile memory in two write cycles.

6. The mass storage device of claim 5, further comprising:
 a power supply configured to provide power to the first nonvolatile memory, the volatile memory, and the controller; and
 a power maintenance circuit, configured to provide power to the first nonvolatile memory, the volatile memory, and the controller for two write cycles.

7. The mass storage device of claim 1, wherein:
 the controller is configured to:
  access table data representing L2P table data stored in the first nonvolatile memory,
  access change data representing a change to the table data,
  regenerate L2P table data based on the table data and the change data, and write the regenerated L2P table data to the volatile memory.

8. The mass storage device of claim 7, wherein the change data is stored in the first nonvolatile memory.

9. The mass storage device of claim 7, wherein the change data is stored in the volatile memory.

10. The mass storage device of claim 7, further comprising a second nonvolatile memory, wherein the change data is stored in the second nonvolatile memory.

11. The mass storage device of claim 1, wherein the controller is configured to:
  determine a maximum amount of data which can be written to the first nonvolatile memory after detection of an imminent power failure; and
  write the L2P change data to the first nonvolatile memory when the change data reaches the maximum amount of data.

12. The mass storage device of claim 1, wherein the controller is configured to allocate storage of the plurality of blades to applications, wherein the allocation is thinly provisioned.

13. The mass storage device of claim 1, wherein the controller is configured to recover data of a failed blade in the plurality of blades in response to an operation to access the data of the failed blade.

14. The mass storage device of claim 1, wherein three or more of the plurality of blades are configured to store parity data and the remaining blades are configured to store data including L2P data written to the device, and wherein the controller is configured to write data along stipes of the remaining blades within the first nonvolatile memory, wherein the parity data within the stripes is based on the data including the L2P data written to the stripes of the remaining blades.

15. The mass storage device of claim 14, wherein the controller is configured to store the parity data that includes three or more types of parity data.

* * * * *